(12) United States Patent
Tinklepaugh et al.

(10) Patent No.: US 6,422,521 B1
(45) Date of Patent: Jul. 23, 2002

(54) HOSE SUPPORT SYSTEM

(75) Inventors: Mark Tinklepaugh, Central Square; Robert Gayfer, Watertown, both of NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/662,625

(22) Filed: Sep. 15, 2000

Related U.S. Application Data

(63) Continuation-in-part of application No. 09/514,165, filed on Feb. 28, 2000.

(51) Int. Cl.[7] .............................................. A62C 13/76
(52) U.S. Cl. ........................... 248/75; 248/92; 248/499; 24/300; 24/301
(58) Field of Search ............................ 248/75, 92, 499, 248/610, 53; 24/300, 301, 230.5, 197, 178, 237; 213/76

(56) References Cited

U.S. PATENT DOCUMENTS

| | | | | |
|---|---|---|---|---|
| 2,442,266 A | * | 5/1948 | Davis | 280/179 |
| 2,820,269 A | * | 1/1958 | Wolff | 24/9 |
| 3,567,041 A | * | 3/1971 | Seay | 248/53 |
| 3,672,004 A | * | 6/1972 | Smith | 24/198 |
| 4,519,564 A | * | 5/1985 | Nadherny | 248/58 |
| 4,826,193 A | * | 5/1989 | Davis | 280/304.1 |
| 4,986,500 A | | 1/1991 | Campbell | |
| 5,063,641 A | * | 11/1991 | Chuan | 24/197 |
| 5,297,828 A | * | 3/1994 | Chung | 292/258 |
| 5,402,557 A | * | 4/1995 | Dalen | 24/68 |
| 5,439,265 A | * | 8/1995 | Plante | 294/152 |
| 5,575,446 A | * | 11/1996 | Swenson et al. | 248/304 |
| 5,794,894 A | * | 8/1998 | Fremund | 248/53 |
| 5,809,620 A | * | 9/1998 | Crowley et al. | 24/302 |
| 6,163,937 A | * | 12/2000 | Mckinnis et al. | 24/302 |

* cited by examiner

Primary Examiner—Kimberly T. Wood
(74) Attorney, Agent, or Firm—Barnes & Thornburg

(57) ABSTRACT

A hose support system for a rail car having a support which includes a flat strap having first and second ends and a tongue connected to the first end of the strap and extending along the strap towards the second end of the strap. A connector at one end of the strap is positioned in a car aperture and a connector at the other end of the strap is positioned in a hose aperture. A resilient element connects the loop at one end of the strap to its connector. A clasp is adjustably positioned on the strap between the ends of the strap and adjusts the length of the strap between the ends. The tongue extends through the clasp. At least one of the connectors may include a loop and a throat extending substantially tangential to the loop. Alternatively, one or more of the connectors may include a spiral. A bearing ring separates the connector and the strap.

29 Claims, 5 Drawing Sheets

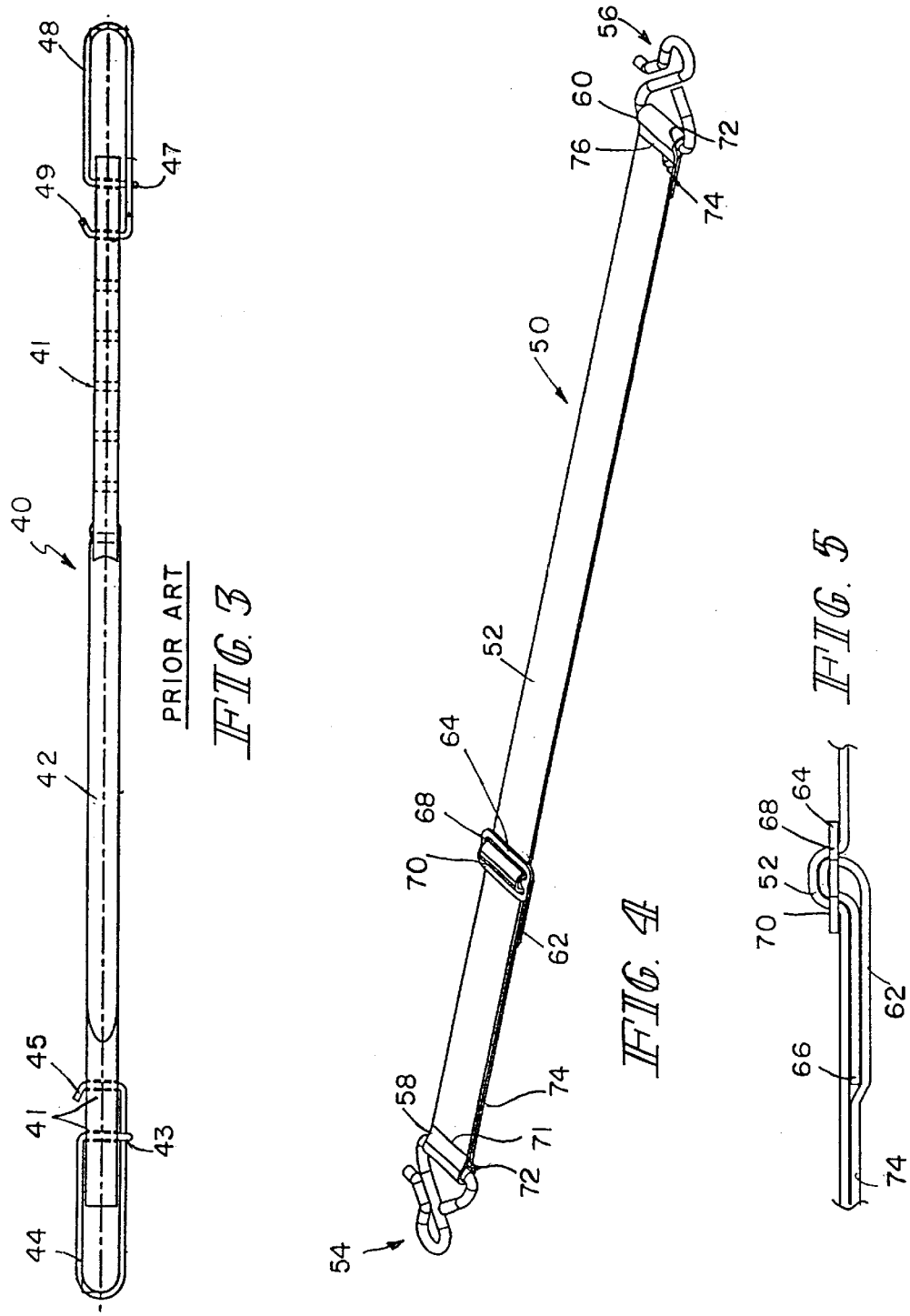

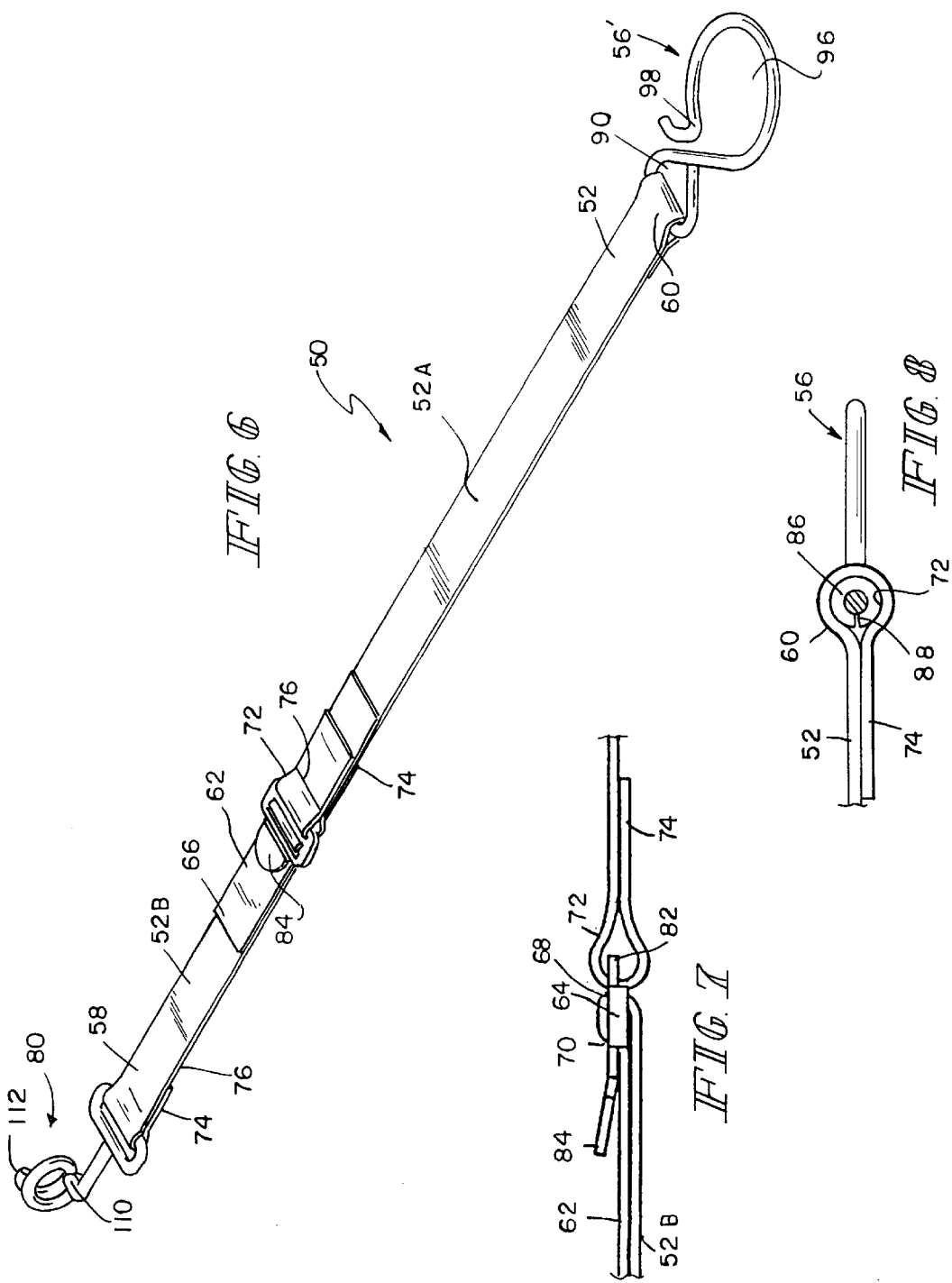

HOSE SUPPORT SYSTEM

CROSS-REFERENCE

This application is a continuation-in-part of U.S. patent application Ser. No. 09/514,165 filed Feb. 28, 2000.

BACKGROUND AND SUMMARY OF THE INVENTION

The present invention relates to a hose support system for connecting and supporting an air hose on a train to a rail car.

Hose support systems generally include a support for the railroad airhose, one at each end of each car, which connected and supported the air hose to the car. As illustrated in FIG. 1, the air hose is supported above a rail and is connected to a coupler and to the end of the car. The original design for the support was a chain with metal "S" hooks to secure it to the hose coupling and a bolt to secure it to the car. A bolt connection allows adjustment in length. The requirements and general description can be found in *Association of American Railroads,* Specification S-4006-90 and S-432. Periodically, the hose must be changed or adjusted in height, both of which require the hose support to be removed or adjusted. More recently, alternatives to the chain have been offered. A product known as STEEL LOC™ available from New York Air Brake Corporation is a high strength polyester cable with copper bridge and sleeves at the ends for easy installation, adjustment and flexibility at the time of weather. Various tabs along the length of the cable allows adjustment of the height.

Another available support is the stainless steel cable which extends through the eye hooks of the hose and coupler and locks onto itself with a bullet shaped nose on each end. The support is illustrated in FIG. 2. A rubber support also available from New York Air Brake Corporation is also illustrated in FIG. 3. Metal wire hooks are interconnected at each end and extra holes are provided for adjustment.

The polyester cable of FIG. 1 and the stainless steel cable of FIG. 2 provide no shock absorption to the hose connection. Great forces are experienced by the support when the pressurized couplers decoupled. The couplers blow apart. Thus, a non-extensible polyester stainless steel cable offers no shock absorption and thus, experiences the total shock forces. The steel cable of FIG. 2 is difficult to adjust or remove from the car. The bullet ends which lances the cable to lock in position is very hard to remove to adjust. Cables get stiff with age. Although the design of FIG. 3 provides shock absorption it does not limit the downward movement. Over time the rubber stretches and takes on a permanent set and needs continuous adjustment. Also, the end connectors are difficult to adjust or remove from the car. Rubber also ages and becomes stiff with age and cold weather.

A hose support system according to the present invention includes a support connecting and supporting a hose to a rail car. The support includes a flat strap having first and second ends and a tongue connected to the first end and extending along the strap towards the second end of the strap. A first connector at one end of the strap is positioned in a car aperture and a second connector at the other end of the strap is positioned at a hose aperture. A clasp is adjustably position on the strap between the ends of the strap and adjusts the lengths of the strap between the ends. The tongue adjustably extends through the clasp. The tongue extends through the clasp and back towards the first end of the strap. The strap may be continuous from the first end to the second end or it may be two pieces joined at the clasp. The strap may also be continuous from the tongue through the first end to the second end. Where the straps is two sections, one of the straps includes the tongue and the other includes the clasp. The clasp has two openings and the tongue traverses both openings.

The strap is cloth and may be made from man made fibers. This could include one or more of KEVLAR (poly-para-phenylene terephthalamide), nylon and polyester. The strap material is substantially non-extensible and has an elongation no greater than 20% under the maximum expected load. A resilient element connecting the loop at one end of the strap to its connector. The resilient element preferable is an elastomeric. The resilient element is of a material which elongates under excessive loads.

At least one of the connectors may include a loop and a throat extending substantially tangential to the loop. The throat may also include at least one flared lip. The throat has a length at least as long as the depth of the aperture in which the connectors rest and/or the diameter of the loop. Alternatively, one or more of the connectors may include a spiral. A bearing ring is between the connector and the strap end.

Other objects, advantages and novel features of the present invention will become apparent from the following detailed description of the invention when considered in conjunction with the accompanying drawings.

BRIEF DESCRIPTION OF THE DRAWINGS

FIG. 3 is a side view of the support strap of rubber according to the prior art.

FIG. 4 is a perspective view of a first embodiment of a support strap according to the principles of the present invention.

FIG. 5 is a side partial view of the strap of FIG. 4.

FIG. 6 is a perspective view of a second embodiment of a support strap according to the principles of the present invention.

FIG. 7 is a partial side view of the strap of FIG. 6.

FIG. 8 is an enlarged partial view of a connector and strap with a bearing according to the principles of the present invention.

DETAILED DESCRIPTION OF THE PREFERRED EMBODIMENTS

Figure 1:
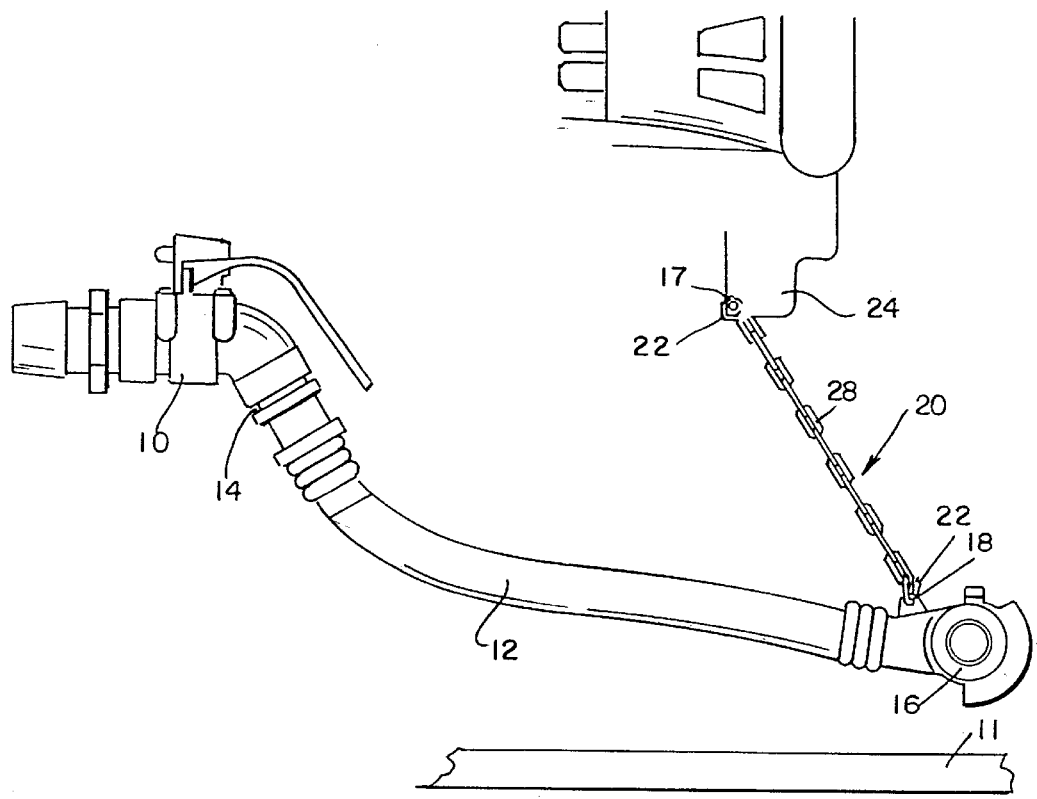
FIG. 1 illustrates a hose support system connected to the hose and car according to the prior art.

The hose support system including a support connecting and supporting a hose to a railcar is illustrated in FIG. 1. An extension adaptor 10 has an air hose 12 connected thereto at 14 and terminates in a glad hand coupling 16. Coupling 16 includes a tab with an aperture eye 18. The support 20 is connected by copper abrasion sleeve 22 in the aperture 18 to the hose and at its other end to an aperture 17 in the car body or coupler 24.

The support 20 may be a high strength polyester cable. Tabs 26 are secured to the cable along its length and includes an opening which may be secured to a connector at the car body coupler 24 to adjust to the length of the support 20. The height is adjusted such that the glad hand 16 is above the height of the rail 11. According to AAR standards, there must be a minimum of 4 inches and a maximum of 5 inches separation from the rail 11.

Figure 2:
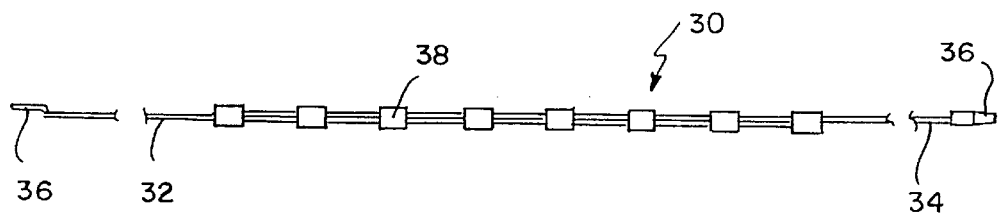
FIG. 2 is a side view of a support cable according to the prior art.
Figure 9:
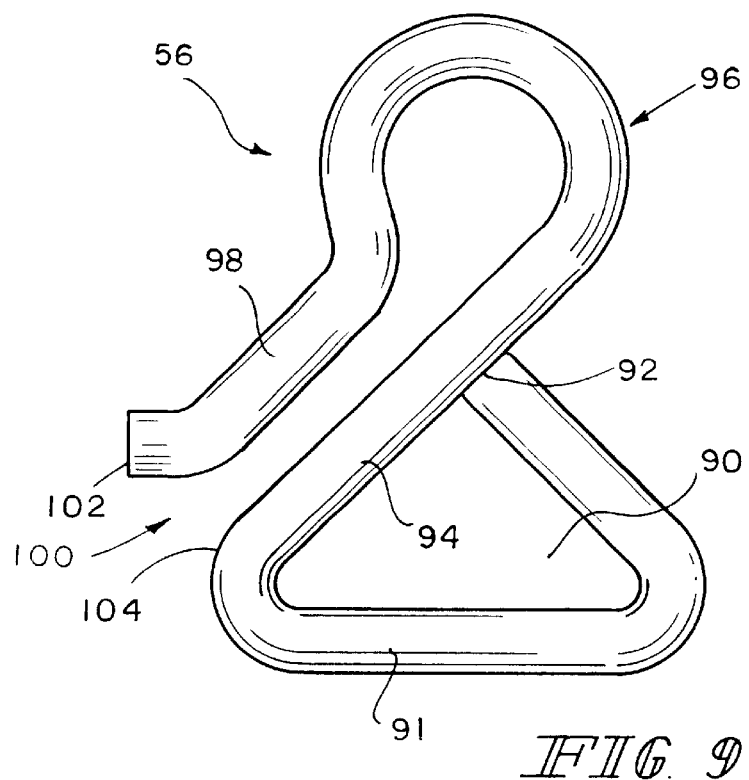
FIG. 9 is an enlarged plan view of the connectors of FIG. 4 for a support strap according to the principles of the present invention.
Figure 10:
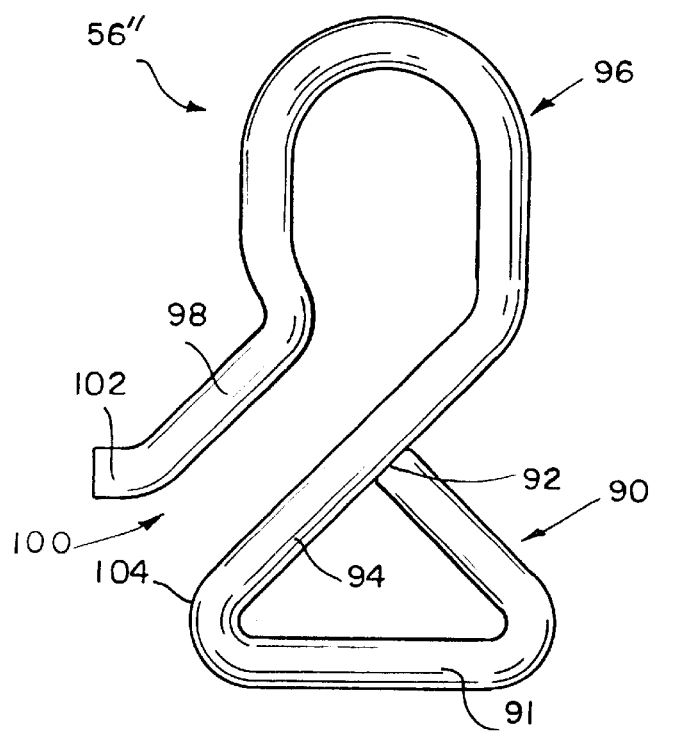
FIG. 10 is a plan view of another connector according to the principles of the present invention.

Another prior art support 30 illustrated in FIG. 2 includes a pair of steel cables 32 and 34 each having bullet ends 36. The overlapping portions of cables 32 and 34 are secured to each other by sleeves 38 which are crimped thereon. The bullets 36 are inserted through the apertures in the hose and the car body and then transverse the overlapped cable portions between the sleeves 38 to be retained thereto. Thus, the height can be adjusted at either or both ends of the cable.

Another prior art support 40 is illustrated in FIG. 3. The body 42 is made of rubber and has a plurality of openings 41 therein. At one end, a hook or coupler 44, which is a metal wire hook, has both of its ends 43 and 45 in a pair of openings 41 in the body 42. At the other end, there are a plurality of openings 41 and the ends 47 and 49 of hook or coupler 48 lie in a pair of openings. The length is adjusted by the hook 48 being inserted in one of the plurality pairs of openings 41 at that end.

One embodiment of a support 50, according to the present invention, is illustrated in FIG. 4. It includes a flat strap 52 having connectors 54 and 56 at ends 58 and 60, respectively, of the strap. The connectors 54 and 56 are received in the apertures of the hose and the car. A tongue 62 which extends from the first end 58 of the strap 52 and extends through a clasp 64. The end 62 of the tongue traverses a pair of openings 68 and 70 of the clasp 64. The connectors 54 and 56 are secured at the ends 58 and 60 of the strap 52 in loops 72 formed by the strap 52 doubling back on itself at 74. The loops are formed by stitching or rivets 76. Also, the overlapping portions of strap material 74 and 52 may be joined together by bonding adhesive or additional stitching. The tongue 62 is not joined to the strap portion 52 and forms a pocket for its end 66 as illustrated in FIG. 5. The tongue 62 extends through the clasp and end 66 is curled back on to itself.

The length of the strap 52 between the ends 58 and 60 is adjusted by moving the clasp 64 along the flat strap portion 52. The clasp 64 is rotated 90° to release the locking on the strap 52 and is moved right or left along the strap 52. Once the desired length is chosen, the strap is rotated back into the planar position as illustrated in FIGS. 4 and 5. The openings 68 and 70 of the clasp may include teeth or other gripping mechanisms to further increase the holding of the strap 52 in its desired length.

A second embodiment of the support 50 according to the present invention is illustrated in FIGS. 6 and 7. The main strap portion 52 is shown as having a first portion 52A and a second portion 52B with connectors 56' and 80 at ends 60 and 58, respectively. Connector 56' has substantially the same shape as 56 with a larger hoop. The connectors 56' and 80 are secured in loops 72 formed by the strap, which doubles back on itself forming overlapping portion 74 and is joined to the strap 52 by stitching or rivets or other forms of attachment 76, including bonding. A bearing 86 separates the connectors from the strap as illustrated in FIG. 8. The bearing ring 86 is a ring split at 88 enclosing a portion of the connector and is in compression in the loop 72 of the strap. This restrains relative rotational movement between the bearing ring 86 and the strap loop.

The tongue portion 62 is an extension of the end of strap 52B and extends through the double openings 68 and 70 of the clasp 64. An end of the strap portion 52A includes the loop section 72 formed by a double back portion 74 secured to the strap portion 52A. The loop 72 is received in a third opening 82 in the clasp 64. A tab 84 extends from the clasp 64.

The strap 50 of FIGS. 6 and 7 is shortened by pulling on the end 66 of the tongue 62. To lengthen the strap of FIGS. 6 and 7, tab 84 and clasp 64 are raised releasing the tension on the tongue 62 and strap portion 52A is pulled. Once the desired length is reached, tab 84 is released and the strap is locked by clasp 64 at the desired length between connectors 80 and 56.

The connector 56, 56', 56" as shown in FIGS. 4, 6, 9 and 10 includes a first loop 90 having a segment 91 extending through loop 72 of the strap 52 and bearing ring 86 and an end 92 terminating adjacent to section 94. The first loop 90 is shown as a triangle. A second loop 96 includes an opening between sections 94 and 98. A throat 100, formed by these sections, extends substantially parallel to section 94 and substantially tangential to the loop 96 and terminates in flared lips 102 and 104. The hose or the car body rest in loop 96. The length of the throat 100 of the connector 56, 56', 56" is at least as long as the depth of the aperture in the car body or the hose coupling and/or the diameter of loop 96. The connector 56 is metal.

Figure 12:
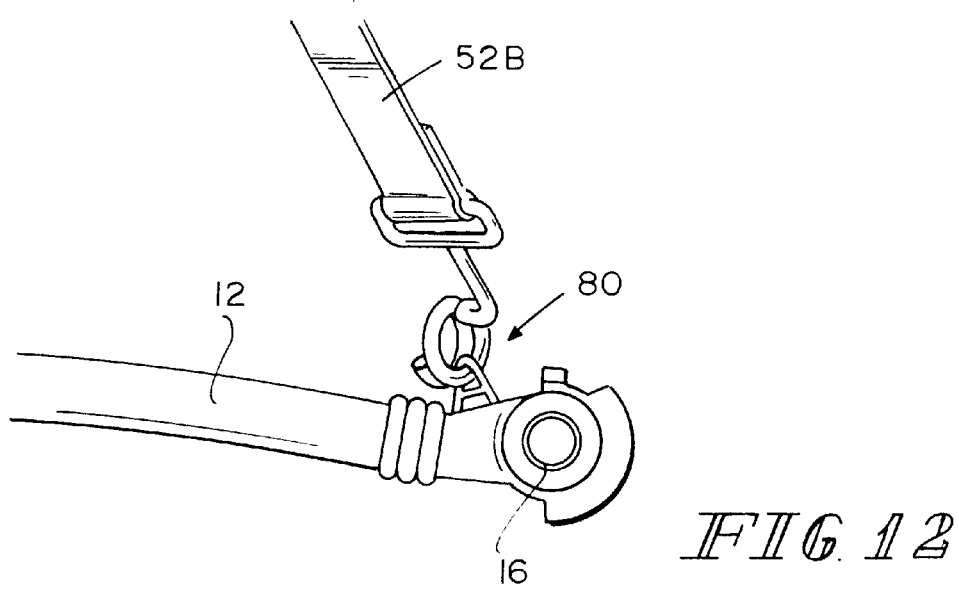
FIG. 12 is a perspective view of a spiral connector in an aperture.

Connector 80 illustrated in FIG. 6 is a continuous spiral completing more than 360° from the point 110 determination 112. As illustrated, the spiral traverses 540°. FIG. 12 shows connector 80 in an aperture on a hose. Although specific connectors have been shown, others may be used. Preferably, they should snap in and be simply removed, though not be displaced by the bouncing experienced while the train is moving.

The strap 52 is made from cloth and preferably from man made fibers. This would include KEVLAR, (poly-para-phenylene), nylon, polyester and other known man made fibers. These materials are woven or knitted to form a cloth or fabric which is substantially non-extensile, but allows some elongation to absorb shock but not resulting in significant change in length over time. The elongation should not be greater than 20% under a maximum anticipated load.

Figure 11:
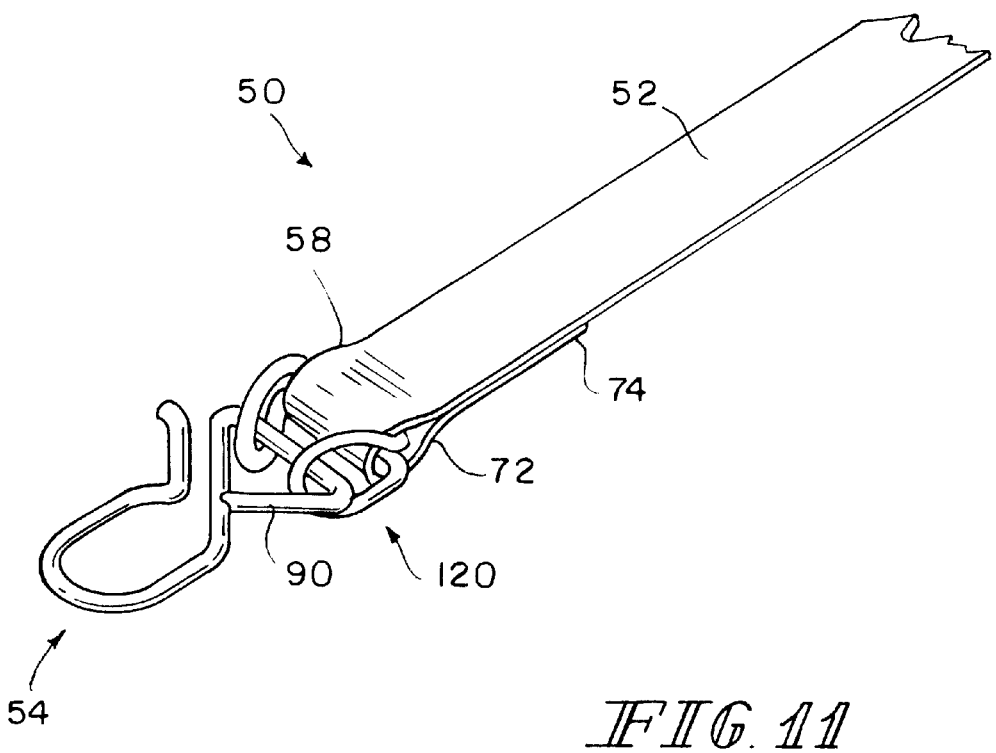
FIG. 11 is a perspective view of an end of a support strap with a resilient element according to the principles of the present invention.

As a further protection of the strap and the connectors, a resilient element may be placed between the strap 52 and one of the connectors as illustrated in FIG. 11. The resilient element 120 is shown as a loop having both of its ends received in loop 90 of the connector 54 and extend through loop 72 at the first end 58 of the strap 52. The resilient element 120 is an elastomeric. Preferably, the elastomeric 120 is an EPDM rubber which is extremely resistant to ozone/sunlight/weathering. This material is four times stiffer than the complete rubber hose strap presently being used. The resilient element is only to dampen or absorb or allow dissipation of the extreme shock forces during uncoupling and separation of the pressurized hose and they flail about briefly. The resilient element is designed only to stretch during this time. Lower stresses due to the motion of train are transferred to the other elements of the strap system without elongation. By using a small portion of resilient material, the longevity of the support system 50 is not compromised as in a total resilient or elastomeric support.

The previously cited AAR standards indicates that the strap should be able to withstand a straight pull load of 150 pounds for at least 10 seconds without failure. Also, it should not have a permanent set of greater than one inch for a 150 pound straight pull load for a very specific period of pull.

By using a fabric, various materials may be used, for example, the thread count, web thickness or width, threads per strand and the twist of the strands and other physical characteristics may vary to produce the desired permanent stretch, ultimate load, shock absorbent characteristics, etc.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hose support system including a support in combination with an aperture on a hose and an aperture on a rail car, the support comprising:
    a flat strap having first and second ends and a tongue connected to the first end and extending along the strap toward the second end of the strap;
    a first connector at one end of the strap in the car aperture and a second connector at the other end of the strap in the hose aperture;
    a clasp adjustably positioned on the strap between the ends of the strap to adjust the length of the strap between the ends; and
    the tongue extending through the clasp.

2. The hose support system according to claim 1, wherein the tongue extends through the clasp and back towards the first end of the strap.

3. The hose support system according to claim 1, wherein the strap is continuous from the first end to the second end.

4. The hose support system according to claim 1, wherein the strap is continuous from the tongue through the first end to the second end.

5. The hose support system according to claim 1, wherein the strap includes a first continuous portion including the first end and the tongue, a second continuous portion separate from the first portion and including the second end and the clasp secured to the second end.

6. The hose support system according to claim 1, wherein the clasp has two openings and the tongue traverses both openings.

7. The hose support system according to claim 1, wherein the strap is a cloth.

8. The hose support system according to claim 1, wherein the strap is a cloth of man made fibers.

9. The hose support system according to claim 1, wherein the strap is a cloth of one or more of nylon and polyester.

10. The hose support system according to claim 1, wherein at least one of the connectors includes a loop and a throat extending substantially tangential to the loop.

11. The hose support system according to claim 10, wherein the throat includes at least one flared lip.

12. The hose support system according to claim 10, wherein the throat has a length at least as long as a depth of any aperture in which the connector rests.

13. The hose support system according to claim 10, wherein the throat has a length at least as long as a diameter of the loop.

14. The hose support system according to claim 1, wherein at least one of the connectors includes a spiral.

15. The hose support system according to claim 1, wherein the strap includes a loop at each end and a bearing ring in the loop and the connectors include a loop extending through the bearing ring.

16. The hose support system according to claim 15, wherein the bearing ring is a split ring in compression in the strap loop.

17. The hose support system according to claim 1, wherein the strap has an elongation no greater than 20% under a maximum expected load.

18. The hose support system according to claim 1, wherein the tongue extends through the clasp back towards the first end and is secured to the strap between the clasp and the first end.

19. The hose support system according to claim 1, including a resilient element between one end of the strap and the connector attached to that end of the strap.

20. The hose support system according to claim 19, wherein the resilient element is an elastomeric.

21. A hose support system including a support connected to an aperture in a hose and connected to an aperture in a rail car, the support comprising:
    a flat strap having first and second ends and a loop at each end;
    a connector at each end including a first loop extending through the strap loop, a second loop and a throat extending substantially tangential to the second loop; and
    a clasp adjustably positioned on the strap between the ends of the strap to adjust the length of the strap between the ends.

22. The hose support system according to claim 21, wherein the throat includes at least one flared lip.

23. The hose support system according to claim 21, wherein the throat has a length at least as long as a depth of any aperture in which the connector rests.

24. The hose support system according to claim 21, wherein the throat has a length at least as long as a diameter of the second loop.

25. A hose support for connecting and supporting a hose to a rail car, the support comprising:
    a flat strap having first and second ends and a loop at each end;
    a bearing ring in each loop;
    a connector at each end including a loop extending through the bearing ring;
    a clasp adjustably positioned on the strap between the ends of the strap to adjust the length of the strap between the ends; and
    wherein the bearing ring is a split ring in compression in the strap loop.

26. A hose support for connecting and supporting a hose to a rail car, the support comprising:
    a flat substantially non-extensible strap having first and second ends and a loop at each end;
    a connector at each end connected to the loop;
    a resilient element connecting the loop at one end of the strap to its connector; and
    a clasp adjustably positioned on the strap between the ends of the strap to adjust the length of the strap between the ends.

27. The hose support system according to claim 26, wherein the resilient element is an elastomeric.

28. The hose support system according to claim 26, wherein the connector includes a loop and the resilient element is a ring extending through the loops on the strap and the connector.

29. The hose support system according to claim 26, wherein the resilient element is of a material which elongates under excessive loads.

* * * * *